US006632557B1

(12) United States Patent
Curelop et al.

(10) Patent No.: US 6,632,557 B1
(45) Date of Patent: Oct. 14, 2003

(54) CATHODES FOR METAL AIR ELECTROCHEMICAL CELLS

(75) Inventors: Edward Curelop, Brockton, MA (US); Sharon Lu, Andover, MA (US); Stephen McDevitt, Somerville, MA (US); David Pappas, Waltham, MA (US); Joseph Sunstrom, Stoughton, MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/427,371

(22) Filed: Oct. 26, 1999

(51) Int. Cl.$^7$ ................................................. H01M 4/88
(52) U.S. Cl. ............................ 429/42; 429/12; 429/13; 429/33; 429/40; 429/42; 429/224; 29/623.1; 29/623.5
(58) Field of Search ............................... 429/12, 13, 33, 429/40, 41, 42, 59, 224, 218, 219, 220; 29/623.5, 623.1

(56) References Cited

U.S. PATENT DOCUMENTS

| | | | |
|---|---|---|---|
| 3,816,180 A | | 6/1974 | Curelop |
| 3,904,432 A | * | 9/1975 | Dey et al. .................. 136/6 |
| 4,214,970 A | | 7/1980 | Spaziante et al. |
| 4,231,889 A | | 11/1980 | Murakami et al. |
| 4,256,545 A | | 3/1981 | Deborski |
| 4,292,197 A | | 9/1981 | Chamberlin |
| 4,354,915 A | * | 10/1982 | Stachurski et al. ......... 204/242 |
| 4,357,262 A | | 11/1982 | Solomon |
| 4,362,790 A | | 12/1982 | Blanchart et al. |
| 4,427,523 A | | 1/1984 | Oda et al. |
| 4,435,267 A | | 3/1984 | Batzold et al. |
| 4,440,617 A | | 4/1984 | Solomon |
| 4,444,852 A | | 4/1984 | Liu et al. |
| 4,518,705 A | | 5/1985 | Solomon et al. |
| 4,536,272 A | | 8/1985 | Blanchart et al. |
| 4,569,924 A | | 2/1986 | Ozin et al. |
| 4,585,711 A | | 4/1986 | Vaidyanathan |
| 4,603,118 A | | 7/1986 | Staab |
| 4,613,552 A | | 9/1986 | Ruben |
| 4,615,954 A | | 10/1986 | Solomon et al. |
| 4,722,773 A | | 2/1988 | Plowman et al. |
| 4,748,095 A | | 5/1988 | Furuya et al. |
| 4,816,431 A | | 3/1989 | Furuya et al. |
| 4,877,694 A | | 10/1989 | Solomon et al. |
| 4,894,296 A | * | 1/1990 | Borbely et al. .............. 429/42 |
| 4,894,355 A | | 1/1990 | Takeuchi et al. |
| 4,908,198 A | * | 3/1990 | Weinberg .................... 423/415 |
| 4,927,514 A | | 5/1990 | Solomon et al. |
| 4,931,168 A | | 6/1990 | Watanabe et al. |
| 5,053,375 A | | 10/1991 | Rao |
| 5,069,988 A | | 12/1991 | Tomantschger et al. |
| 5,124,018 A | | 6/1992 | Furuya et al. |
| 5,190,833 A | * | 3/1993 | Goldstein et al. ........... 429/210 |

(List continued on next page.)

FOREIGN PATENT DOCUMENTS

| | | |
|---|---|---|
| EP | 0 292 431 A2 | 11/1988 |
| EP | 0 332 953 B1 | 9/1993 |
| EP | 0 314 230 B1 | 12/1993 |
| EP | 0 617 441 A1 | 9/1994 |
| EP | 0 370 149 B1 | 6/1996 |
| EP | 0 621 236 B1 | 3/1998 |
| EP | 0 855 752 A2 | 7/1998 |
| EP | 0 473 715 B1 | 8/1998 |

*Primary Examiner*—Carol Chaney
*Assistant Examiner*—Dah Wei Yuan
(74) *Attorney, Agent, or Firm*—Fish & Richardson P.C.

(57) ABSTRACT

A textured dual layer metal air cathode is disclosed. The cathode includes a first layer that contains 30% to 70% organic polymer by weight, a second layer that contains 10% to 30% organic polymer by weight, and a catalyst. The first layer and the second layer contact each other at a textured interface.

26 Claims, 10 Drawing Sheets

U.S. PATENT DOCUMENTS

| | | | |
|---|---|---|---|
| 5,221,453 A | | 6/1993 | Crespi |
| 5,312,701 A | * | 5/1994 | Khasin et al. ................. 429/27 |
| 5,441,823 A | * | 8/1995 | Naimer et al. ................. 429/42 |
| 5,480,735 A | | 1/1996 | Landsman et al. |
| 5,563,004 A | * | 10/1996 | Buzzelli et al. ............... 429/27 |
| 5,620,807 A | | 4/1997 | Mussell et al. |
| 5,639,577 A | | 6/1997 | Takeuchi et al. |
| 5,716,422 A | | 2/1998 | Muffoletto et al. |
| 5,846,670 A | | 12/1998 | Watanabe et al. |
| 5,871,860 A | * | 2/1999 | Frost et al. ................... 429/40 |
| 5,885,729 A | | 3/1999 | Marchetti |
| 5,932,367 A | * | 8/1999 | Collien et al. ................ 429/29 |
| 6,242,121 B1 | * | 6/2001 | Pedicini et al. ............... 429/27 |

* cited by examiner

CATHODES FOR METAL AIR ELECTROCHEMICAL CELLS

BACKGROUND OF THE INVENTION

The invention generally relates to metal air electrochemical cells.

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a sheet-like layer, typically called the separator.

When a battery is used as an electrical energy source in a device, such as a hearing aid or a cellular telephone, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

One configuration of a battery is a button cell, which has the approximate size and cylindrical shape of a button. In a button cell, the container for the anode and the cathode includes a lower cup-like structure, called the cathode can, and an upper cup-like structure retained within the cathode can, called the anode can. The anode can and the cathode can are separated by an insulator, such as an insulating gasket or seal. The anode can and the cathode can are crimped together to form the container.

In a metal air electrochemical cell, oxygen is reduced at the cathode, and a metal is oxidized at the anode. Oxygen is supplied to the cathode from the atmospheric air external to the cell through air access ports in the container. Oxygen diffuses through the cathode structure to the reaction zone. Oxygen reduction requires a three phase reaction zone consisting of air, the electrolyte, and a carbon-catalyst component. The cathode must be wetted in order for oxygen reduction to occur. If too much wetting occurs, however, the cathode can wet-through entirely. When the cathode wets through, the cell polarizes, i.e., the power output from the cell drops precipitously; in addition, the electrolyte solution can leak through to the exterior of the cell.

SUMMARY OF THE INVENTION

In general, the invention relates to cathodes for metal air electrochemical cells, and methods for making these cathodes. Electrochemical cells made with cathodes of the invention are relatively resistant to wet-through problems and, at the same time, are capable of generating high currents. The methods and compositions of the present invention can therefore be used to make metal air cells having good performance characteristics, especially in high rate applications.

In one aspect, the invention features a cathode for a metal air electrochemical cell; the cathode includes (a) a first layer including about 30% to about 70% of an organic polymer, such as polytetrafluoroethylene, by weight; (b) a second layer including about 10% to about 30% of an organic polymer, such as polytetrafluoroethylene, by weight; and (c) a catalyst. The first layer and the second layer contact each other at a textured interface.

A "textured" interface includes at least one textured surface. A textured surface is one that is not smooth, i.e., one that is roughened, and therefore has a higher surface area than a smooth surface of the same dimensions. It is thus the macroscopic texture that is referenced here, as opposed to the microscopic texture observed on individual particles in the electrode. The geometric surface area of a textured surface is preferably at least 10% higher, and more preferably at least 25% or 50% higher, than that of a smooth, flat surface of the same dimensions.

The dual layer textured cathode of the invention offers several advantages. The layer adjacent to the anode gel has a relatively low concentration of an organic polymer such as polytetrafluoroethylene (PTFE). The low concentration of PTFE makes this layer relatively hydrophilic, and the hydrophilicity of this layer promotes wetting. Sufficient wetting of this layer is important for oxygen reduction. The layer adjacent to the air access ports has a higher concentration of PTFE, making it hydrophobic. The hydrophobicity of this layer helps to prevent the cathode from wetting through. The two layers contact each other at an interface, which is textured to provide a higher surface area for the three phase (i.e., air, electrolyte, and catalyst) reaction zone. The higher surface area improves cell performance during high rate discharge.

The cathode can be used in the preparation of an electrochemical cell having very good discharge capacities.

In another aspect, the invention features a method of making a cathode for an electrochemical cell that includes combining carbon with $AgMnO_4$ to form a mixture, then preparing a cathode with the mixture. The cathode can be used to prepare a metal air cell or an alkaline air cell.

The use of $AgMnO_4$ as a catalyst precursor offers numerous advantages. For example, the decomposition of $AgMnO_4$ results in fine dispersions of $MnO_2$ and Ag. Ag facilitates the direct reduction of $O_2$ to 4 $OH^-$. This is useful because manganese dioxide cannot participate in the 4 $e^-$ reduction of $O_2$ to 4 $OH^-$. Those oxygen atoms that are not reduced to $OH^-$ in the 4 $e^-$ process may be reduced to peroxide ($HO_2^-$) in a two $e^{31}$ process. Rapid elimination of this peroxide will enable a higher running voltage for the cathode. Both Ag and $MnO_2$ are effective peroxide elimination catalysts. A further advantage is that silver improves the conductivity of the cathode.

In another aspect, the invention features a cathode for a metal air electrochemical cell; the cathode contains manganese and silver and is substantially free of potassium. By "substantially free of potassium," it is meant that the cathode is substantially free of potassium before the cathode contacts the electrolyte in the cell. The cathode preferably contains less than about 7 percent by weight silver or less than about 3 percent by weight silver.

In another aspect, the invention features a cathode for a zinc air cell that has a current density of at least 70 $MA/cm^2$ at a voltage of −0.25 volts, versus a Hg/HgO reference. Preferred cathodes can have current densities of at least 80, 90, 100, or 150 $mA/cm^2$ at a voltage of −0.25 volts, versus a Hg/HgO reference.

In another aspect, the invention features a cathode for an electrochemical cell. The cathode includes a catalyst, and is prepared using $AgMnO_4$ as a catalyst precursor.

Other features and advantages of the invention will be apparent from the description of the preferred embodiment thereof, and from the claims.

DESCRIPTION OF THE PREFERRED EMBODIMENTS

The cathodes of the invention can be used in electrochemical cells, such as zinc air cells. The cathodes of the invention are capable of producing currents as high as 115 mA/cm$^2$. Electrochemical cells made with cathodes of the invention exhibit good discharge performance under a variety of conditions.

The cathodes described herein can also be used in other battery forms, such as AAA batteries and prismatic cells. In addition, the methods of the invention can be used to prepare cathodes for air-assisted alkaline batteries.

Figure 1:
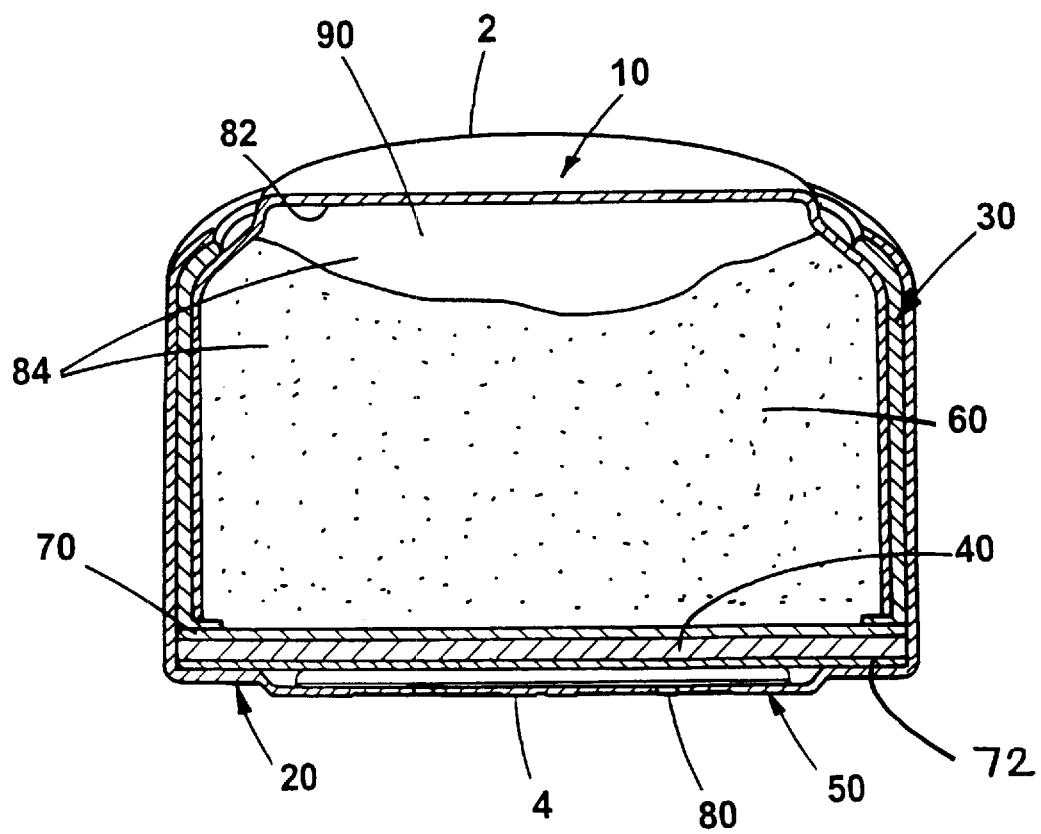
FIG. 1 is a cross-sectional view of a metal air cell.

A zinc air cell can be, for example, a button cell. Referring to FIG. 1, a button cell includes an anode side 2 and a cathode side 4. Anode 2 includes anode can 10 and anode gel 60. Cathode 4 includes cathode can 20 and cathode structure 40. Insulator 30 is located between anode can 10 and cathode can 20. Separator 70 is located between cathode structure 40 and anode gel 60, preventing electrical contact between these two components. Membrane 72 helps prevent the electrolyte from leaking out of the cell. Air access port 80, located in cathode can 20, allows air to exchange into and out of the cell. Air disperser 50 is located between air access port 80 and cathode structure 40.

Anode can 10 and cathode can 20 are crimped together to form the cell container, which has an internal volume, or cell volume. Together, inner surface 82 of anode can 10 and separator 70 form anode volume 84. Anode volume 84 contains anode gel 60. The remainder of anode volume 84 is void volume 90.

The anode can includes a tri-clad or bi-clad material. The bi-clad material is generally stainless steel with an inner surface of copper. The tri-clad material is composed of stainless steel having a copper layer on the inner surface of the can and a nickel layer on the outer surface of the can. The anode can may include tin or other agents on the inner surface. Preferably, the tin is on the inside surface of the anode can that makes contact with the zinc anode and the electrolyte. The tin may be a continuous layer on the inner surface of the can. The tin layer may be a plated layer having a thickness between about 1 and 12 microns, preferably between about 2 and 7 microns, and more preferably about 4 microns. The tin may be pre-plated on the metal strip or post-plated on the anode can. For example, the tin can be deposited by immersion plating (e.g., using a plating solution available from Technics, Rhode Island). The plated layer can have a bright finish or a matte finish. The coating may also include silver or gold compounds.

The cathode can is composed of cold-rolled steel having inner and outer layers of nickel. There is an insulator, such as an insulating gasket, that is pressure-fit between the anode can and cathode can. The gasket can be thinned to increase the capacity of the cell.

The can configuration may have a straight wall design, in which the anode can side wall is straight, or a foldover design. The foldover design is preferred for thinner-walled cans, e.g., those having a thickness of about 4 microns or less. In a foldover design, the clip-off edge of the anode can, which is generated during stamping of the can, is placed on the top, outside of the can, away from the interior of the cell. The foldover design can reduce potential gas generation by decreasing the possibility of zinc making contact with exposed stainless steel at the anode can clip-off edge. A straight wall design can be used in conjunction with an L- or J-shaped insulator, preferably J-shaped, that can bury the clip-off edge into the insulator foot. When a foldover design is used, the insulator can be L-shaped.

Overall cell height and diameter dimensions are specified by the International Electrotechnical Commission (IEC). A button cell can have a variety of sizes: a 675 cell (IEC designation "PR44") has a diameter between about 11.25 and 11.60 millimeters and a height between about 5.0 and 5.4 millimeters; a 13 cell (IEC designation "PR48") has a diameter between about 7.55 and 7.9 millimeters and a height between about 5.0 and 5.4 millimeters; a 312 cell (IEC designation "PR41") has a diameter between about 7.55 and 7.9 millimeters and a height of between about 3.3 and 3.6 millimeters; and a 10 cell (IEC designation "PR70") has a diameter between about 5.55 and 5.80 millimeters and a height between about 3.30 and 3.60 millimeters. A 5 cell has a diameter between about 5.55 and 5.80 millimeters and a height between about 2.03 and 2.16 millimeters. The cell can have an anode can thickness of about 0.1016 mm. The cell can have an cathode can thickness of about 0.1016 mm.

The anode can include a surface comprised of tin or its alloys in contact with the anode gel. The cathode structure can include a catalyst mixture and a current collector in electrical contact with the cathode can. The catalyst mixture can include polytetrafluoroethylene or other polymeric binder materials.

A zinc air cell uses zinc as the electrochemically active anode material. The anode gel contains a mixture of zinc and electrolyte. The mixture of zinc and electrolyte can include a gelling agent that can help prevent leakage of the electrolyte from the cell and helps suspend the particles of zinc within the anode. The cathode structure contains a material or a combination of materials (e.g., a manganese compound, or a combination of a manganese compound and a precious metal) that can catalyze the reduction of oxygen ($O_2$) which enters the cell as a component of atmospheric air passing through access ports in the bottom of the cathode can. The overall electrochemical reaction within the cell results in zinc metal being oxidized to zinc ions and $O_2$ from air being reduced to hydroxyl ions ($OH^-$). Ultimately, zincate, or zinc oxide, is formed in the anode. While these chemical reactions are taking place, electrons are transferred from the anode to the cathode, providing power to the device.

During storage, the air access ports are typically covered by a removable sheet, commonly known as the seal tab, that is provided on the bottom of the cathode can to cover the air access ports to restrict the flow of air between the interior and exterior of the button cell. The user peels the seal tab from the cathode can prior to use to activate the cell. This allows oxygen from the air to enter the interior of the button cell from the external environment.

Figure 2B:
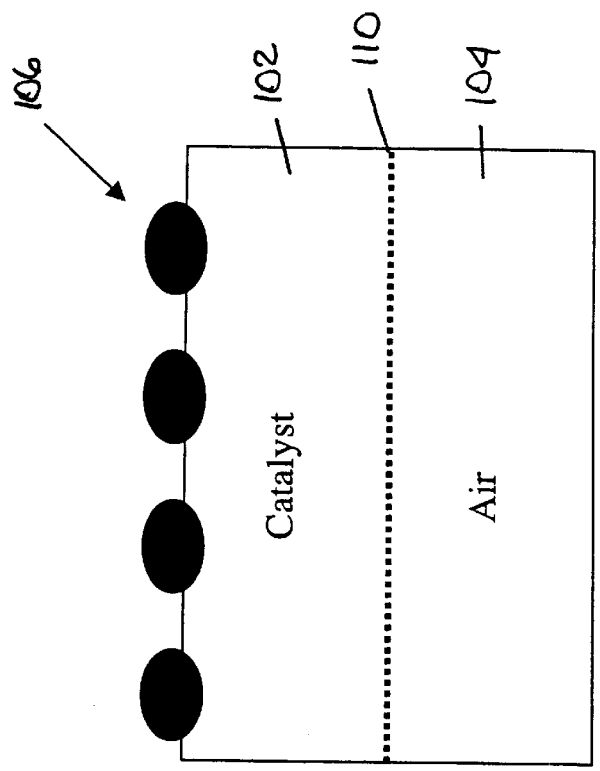
FIGS. 2a–b and 3a–c are diagrams showing dual layer cathodes.
Figure 2A:
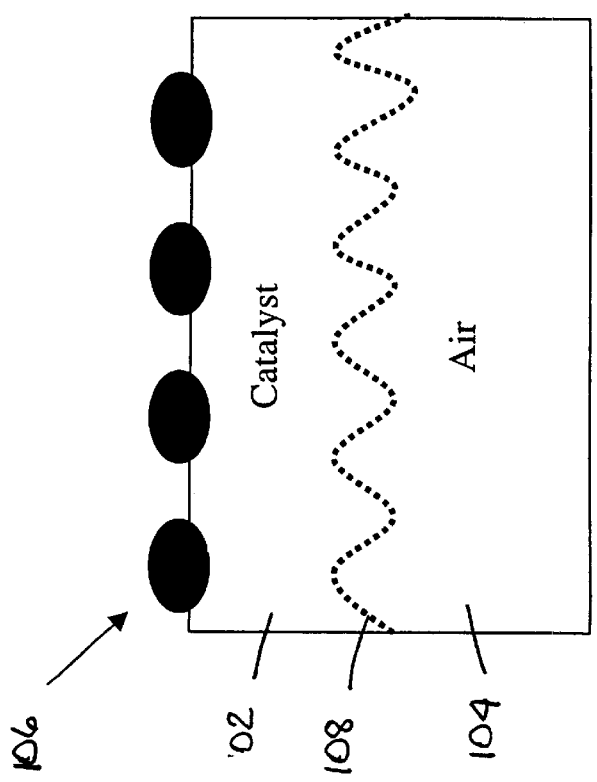

Referring to FIG. 2a, the cathode structure has a side 102 facing the anode gel and a side 104 facing the air access ports. In dual-layer cathodes, the side facing the anode gel is typically referred to as the catalyst layer or active layer, and the side facing the air access ports is referred to as the air layer or hydrophobic layer. The cathode structure also includes a current collector 106, such as a wire mesh, which contacts the cathode mixture. The current collector makes electrical contact with the cathode can.

The two cathode layers contact each other at a textured interface 108. The textured interface provides more surface area between the two layers than a non-textured interface 110, shown in FIG. 2b.

The side of the cathode structure facing the anode gel is covered by a separator. The separator can be a porous, electrically insulating polymer, such as polypropylene, that allows the electrolyte to contact the air cathode. The side of the cathode structure facing the air access ports is typically covered by a polytetrafluoroethylene (PTFE) membrane that can help prevent drying of the anode gel and leakage of electrolyte from the cell. Cells can also include an air disperser, or blotter material, between the PTFE membrane and the air access ports. The air disperser is a porous or fibrous material that helps maintain an air diffusion space between the PTFE membrane and the cathode can.

Figure 3C:
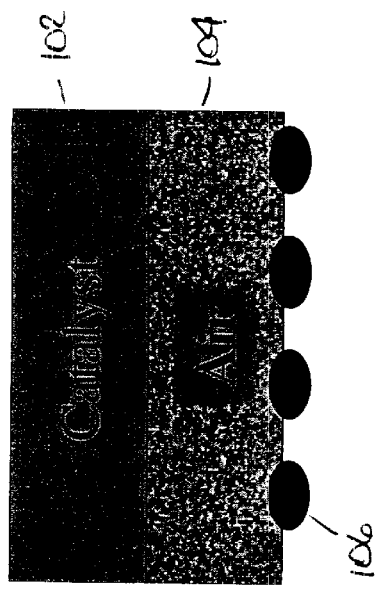
Figure 3B:
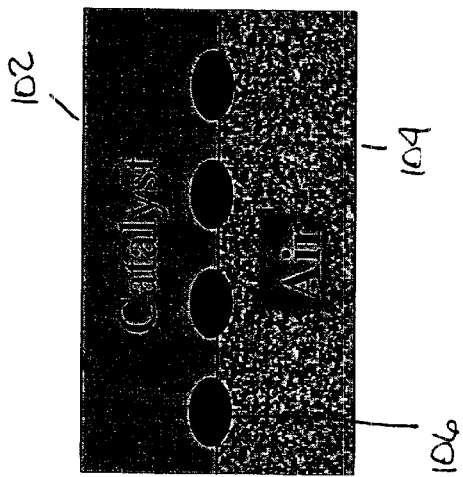
Figure 3A:
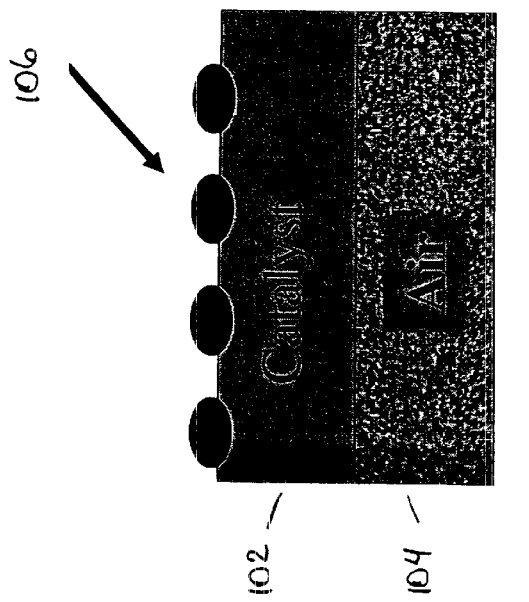

The current collector 106 can be disposed on the catalyst face of the cathode, as shown in FIG. 3a, in between the catalyst and air layers, as shown in FIG. 3b, or on the air face of the cathode, as shown in FIG. 3c.

The cathode mixture may include one or more catalysts for reducing oxygen. These catalysts include, but are not limited to, manganese compounds, precious metals, metal heterocycles, and cobalt, and mixtures thereof. The cathode may include from about 0.1% to about 20% of the catalyst by weight. The catalyst mixture contains a mixture of particles of an organic polymer (e.g., PTFE) and carbon particles; it may also include one or more catalysts. In dual-layer cathodes, the catalyst layer contains one or more catalysts. The air layer may also contain catalysts, which may be the same as or different from the catalysts contained in the catalyst layer. In addition, the interface between the catalyst layer and the air layer may be coated with a catalyst, which may the same as or different from the catalysts contained in the catalyst layer and the air layer. This catalyst can be applied by any of a number of methods, e.g., sputtering, painting, slurry coating, or spraying the catalyst on the textured interface. Preferably, the interface is coated with a catalyst such as platinum or silver. When platinum is used, the cathode generally contains less than about 3% by weight of the platinum catalyst.

Manganese oxide catalysts are useful in air cathodes because they remediate peroxide in the cathode, and thereby increase the running voltage. A manganese oxide-containing catalyst mixture can be prepared, for example, by heating manganese nitrate or by reducing potassium permanganate to produce manganese oxides such as $Mn_2O_3$, $Mn_3O_4$, and $MnO_2$.

When manganese nitrate is used as the catalyst precursor, the manganese nitrate must be heated in order to deposit manganese oxides on the carbon particles. As a result of the high temperatures required, an uneven dispersion of manganese oxides can be deposited on the carbon support.

A dual catalyst system that solves this problem can be prepared by reducing silver permanganate, to produce dispersions of manganese oxides and silver. $AgMnO_4$ is readily soluble in water at room temperature and reacts with carbon at room temperature; it can therefore be deposited onto the carbon particles without being heated. The use of $AgMnO_4$ permits the deposition of $MnO_2$ particles as fine dispersions, which enhances cathode performance.

The use of $AgMnO_4$ as a precursor also allows for the deposition of fine particles of Ag on the carbon. The Ag facilitates the direct reduction of $O_2$ to 4 $OH^-$. This is useful, because manganese dioxide cannot participate in the 4 $e^-$ reduction of $O_2$ to 4 $OH^-$. A further advantage is that silver improves the conductivity of the cathode. $AgMnO_4$ can also be used as a catalyst precursor for air-assisted alkaline cells.

The catalyst mixture can be prepared as follows. The carbon particles (e.g., Black Pearls 2000 (Cabot, Billerica, Mass.), Vulcan XC-72 (Cabot), Shawinigan Black (SAB) (Chevron, San Francisco, Calif.), Printex, Ketjenblack carbon particles (Akzo Nobel, Chicago, Ill.), or PWA (Calgon Carbon, Pittsburgh, Pa.) are immersed in an aqueous solution of $AgMnO_4$. Preferably less than about 5% by weight of the $AgMnO_4$ is used. In some embodiments, a chemical reducing agent such as hydrazine or hydroxylamine is added to reduce $AgMnO_4$ to Ag and $MnO_2$. The slurry is occasionally allowed to settle. When the supernatant liquid goes from dark violet to colorless, the water is allowed to slowly evaporate, or is decanted, leaving a cake of carbon. The cake is heat treated in a temperature range of 100–140° C. for several hours in air. In other embodiments, the catalysts can be deposited by spray drying or by painting the catalyst onto the support.

For monolayer cathodes, the catalyst mixture can include between about 15 and 45 percent of an organic polymer, such as polytetrafluoroethylene, by weight. For example, the cathode structure can include about 40 percent PTFE, which can make the structure more moisture resistant, reducing the likelihood of electrolyte leakage from the cell. The cathode structure can have an air permeability—without a separator and with one layer of PTFE film laminated on the screen—of between about 300 and 600 sec/in$^2$, preferably about 400 sec/in$^2$, for 10 cubic centimeters of air. The air permeability can be measured using a Gurley Model 4150. The air permeability of the cathode structure can control the venting of hydrogen gas in the cells, thus releasing the pressure, improving cell performance, and reducing leakage.

Preferably, the cathodes of the invention have a dual-layer structure, with the air layer having a higher PTFE content than the catalyst layer. The interface between the air layer and the catalyst layer is preferably textured. An exemplary dual-layer cathode can be prepared as follows.

The carbons that may be used to fabricate dual layer cathodes include, but are not limited to, Black Pearls 2000 (Cabot, Billerica, Mass.), Vulcan XC-72 (Cabot), Monarch 1300, Shawinigan Black, Printex, Ketjenblack particles, and PWA. The catalyst layer may include any of these carbons, which may be treated or untreated with catalysts.

The catalysts which may be used include, but are not limited to, manganese oxides, precious metals, metal heterocycles, silver, cobalt, and manganese-cobalt based spinels, or mixtures of these catalysts. Faradiser (Sedema, Inc., Belgium) chemically synthesized manganese dioxide (CMD) particles (e.g., FAR TR or FAR M) may be used. These particles have high surface areas and high porosities. The use of these particles results in high rate capabilities and high running voltages. The loading of the catalyst may vary from 0.1 to 20% by weight. The weight percent of the catalyst is calculated by dividing the amount of the catalyst by the amount of carbon.

The carbon and/or the catalyzed carbon is mixed with a T-30 PTFE dispersion (60% by weight solids) and isopropanol to form a dough (7–15% by weight PTFE solids) which is rolled onto a stainless steel screen. The catalyst layer is textured by pressure rolling it against a roughened surface, then allowed to dry. The roughened surface can be a 10 to 30 mesh screen. In a 10 mesh screen, a 1×1 in square of the screen has 10×10 squares. In a 30 mesh screen, a 1×1 in square of the screen has 30×30 squares. The catalyst layer is typically 0.24–0.40 mm thick. The screen is preferably pushed at least half-way into the catalyst layer. After the catalyst layer has been textured as just described, the imprint of the screen can be seen on the layer.

The air layer includes any of the above-listed carbons, mixed with a T-30 PTFE dispersion (60% by weight solids). The carbon is mixed with the PTFE and isopropanol to form a dough (30–50% by weight PTFE solids), which is then rolled onto the catalyst layer. After drying and heat treatment of the cathode, the finished catalyst is typically 0.40–0.50 mm thick.

The electrochemical cell further includes an anode formed of an anode gel and an electrolyte. The anode gel contains a zinc material and a gelling agent.

The zinc material can be a zinc alloy powder that includes less than 3 percent mercury, less than 2 percent mercury, or no added mercury. The zinc material can be alloyed with lead, indium, bismuth, tin, or aluminum, or a combination of these elements. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth. Alternatively, the zinc can include lead without another metal additive. The zinc material can be air blown or spun zinc. Suitable zinc particles are described, for example, in U.S. Ser. No. 09/156,915, filed Sep. 18, 1998, U.S. Ser. No. 08/905,254, filed Aug. 1, 1997, and U.S. Ser. No. 09/115,867, filed Jul. 15, 1998, each of which is incorporated by reference in its entirety. The zinc can be a powder. The particles of the zinc can be spherical or nonspherical. For example, the zinc particles can be acicular in shape (having an aspect ratio of at least two).

The zinc material includes a majority of particles having sizes between 60 mesh and 325 mesh. For example, the zinc material can have the following particle size distribution:

0–3 wt % on 60 mesh screen;
40–60 on 100 mesh screen;
30–50 wt % on 200 mesh screen;
0–3 wt % on 325 mesh screen; and
0–0.5 wt % on pan.

Suitable zinc materials include zinc available from Union Miniere (Overpelt, Belgium), Duracell (USA), Noranda (USA), Grillo (Germany), or Toho Zinc (Japan).

Zinc air anode materials are loaded into a cell in the following manner. A gelling agent and zinc powder are mixed to form a dry anode blend. The blend is then dispensed into the anode can and the electrolyte is added to form the anode gel.

The gelling agent is an absorbent polyacrylate. The absorbent polyacrylate has an absorbency envelope of less than about 30 grams of saline per gram of gelling agent, measured as described in U.S. Pat. No. 4,541,871, incorporated herein by reference. The anode gel includes less than 3 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. No. 4,541,871, U.S. Pat. No. 4,590,227, or U.S. Pat. No. 4,507,438.

In certain embodiments, the anode gel can include a non-ionic surfactant, and an indium or lead compound, such as indium hydroxide or lead acetate. The anode gel can include between about 50 and 500 ppm, preferably between 50 and 200 ppm, of the indium or lead compound. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 percent of potassium hydroxide. The electrolyte can also include between about 1 and 2 percent of zinc oxide.

The invention is further described in the following examples, which do not limit the scope of the invention described in the claims.

EXAMPLE 1

Vulcan XC-72 carbon was obtained from Cabot (Billerica, Mass.). $AgMnO_4$ was obtained from Alfa Aesar (Ward Hill, Mass.). 13.05 g of $AgMnO_4$ were dissolved in 2 L water at 25° C. to produce a deep purple solution. After the $AgMnO_4$ was dissolved, 100 g of Vulcan XC-72 was stirred into the $AgMnO_4$/water solution. The solution was covered and allowed to stir for 24 hours to allow distribution of the catalyst in the pores of the carbon. The slurry was allowed to mix until the supernatant liquid was colorless after the carbon settled. The supernatant liquid was then decanted. The remaining mixture was poured into a stainless steel pan. The mixture was placed in a furnace and heated at 140° C. for 8 hours. The resulting carbon cake was pulverized and used for the fabrication of finished electrodes.

Figure 4:
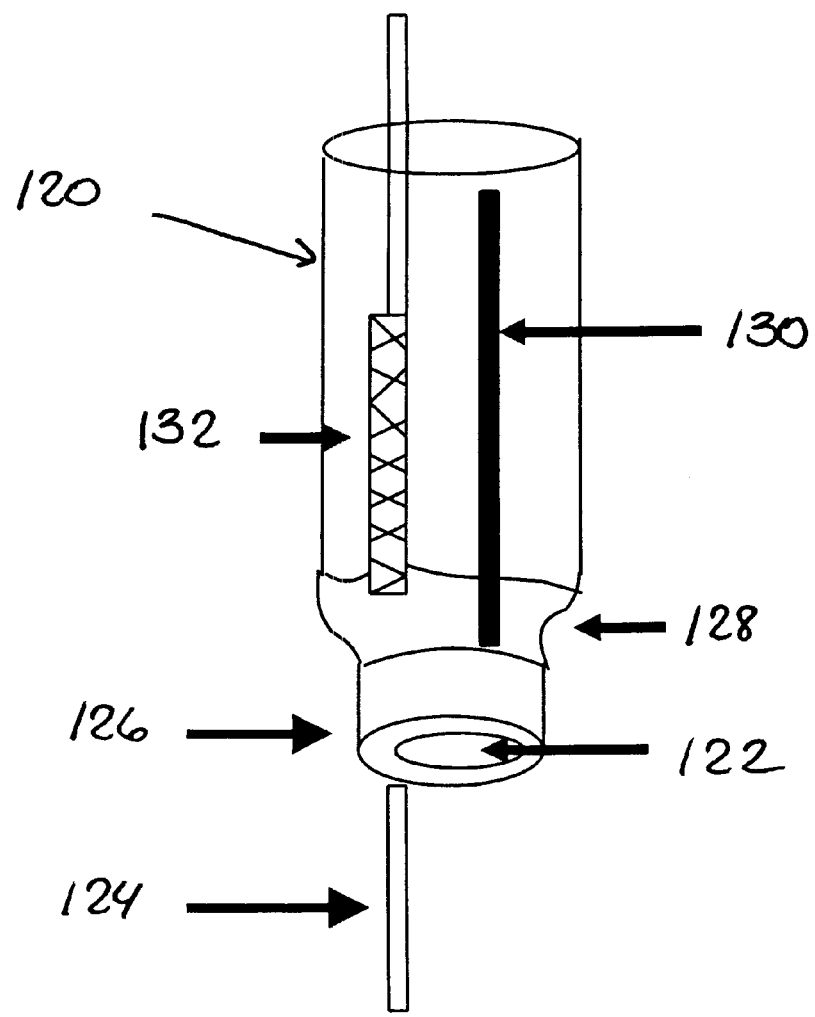
FIG. 4 is diagram showing the apparatus used to measure polarization curves of different cathodes.

Cathodes containing 5% $MnO_2$ catalyst, based on the weight of carbon, were prepared using $AgMnO_4$ as a catalyst precursor. The polarization curves of these cathodes were measured using an Arbin electrochemical test unit. Referring to FIG. 4, the fixture used to measure the polarization curves consisted of a Teflon bottle 120 with the bottom cut off. The cathode sample 122 was a circular piece which was blanked from a cathode sheet. A nickel tab 124 was welded onto the cathode sample screen. A serum cap 126 and PTFE washer (not shown) were used to hold the cathode sample in the fixture. The anode 128 was a slurry consisting of zinc powder and gelled KOH. A Hg/HgO reference electrode 130 was used.

The anode current collector 132 was a piece of copper screen which was rolled into a cylinder and welded. A nickel tab was attached to the copper screen cylinder and the entire assembly was electroplated with tin.

The current was stepped up 1 mA every 90 seconds without a rest period between steps. The current was stepped until the cathode voltage reached −0.500 volts against the Hg/HgO reference electrode. The limiting current reported was the current value at a cathode voltage of −0.25 volts versus Hg/HgO. This value was equivalent to a cathode voltage of 1.1 volts versus Zn.

Figure 5:
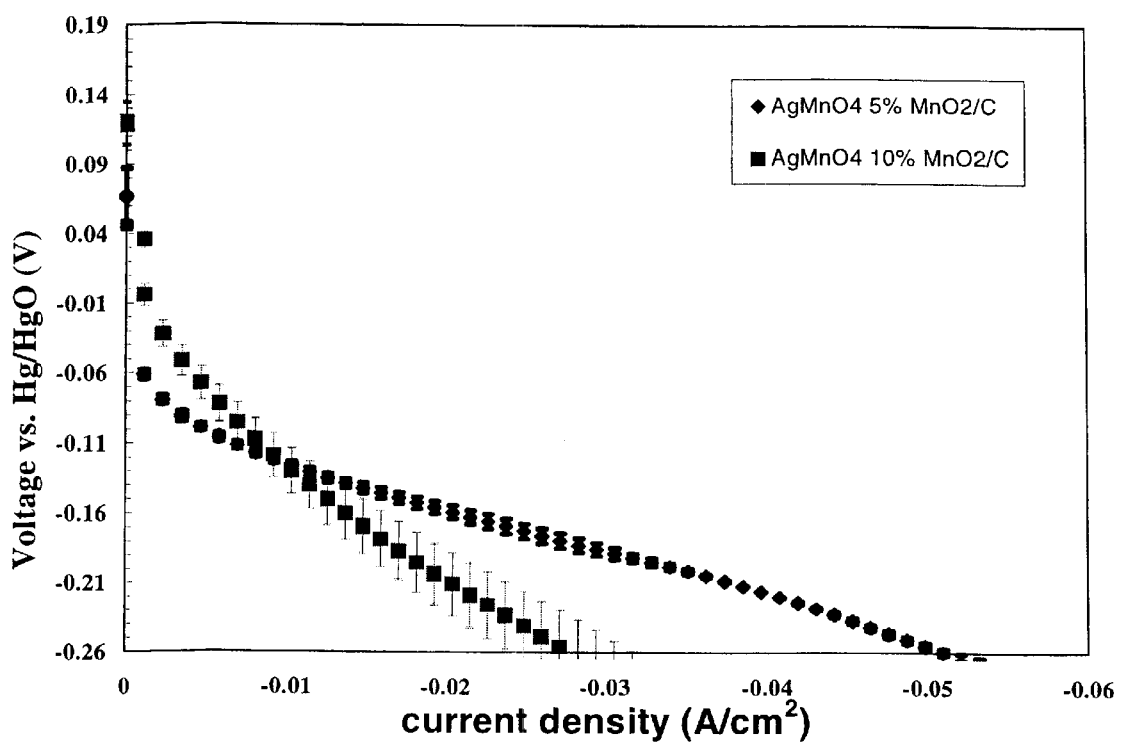
FIG. 5 is a graph showing the limiting currents of cathodes of the invention.

Referring to FIG. 5, the cathode had a limiting current of 51 mA/cm$^2$ at a cathode voltage of –0.25 volts versus Hg/HgO. Cathodes containing higher concentrations of MnO$_2$ (e.g., 10% MnO$_2$/C) did not perform as well (See FIG. 5.) As shown there, a cathode containing 10% MnO$_2$ by weight had a limiting current of 26 mA/cm$^2$.

Figure 6:
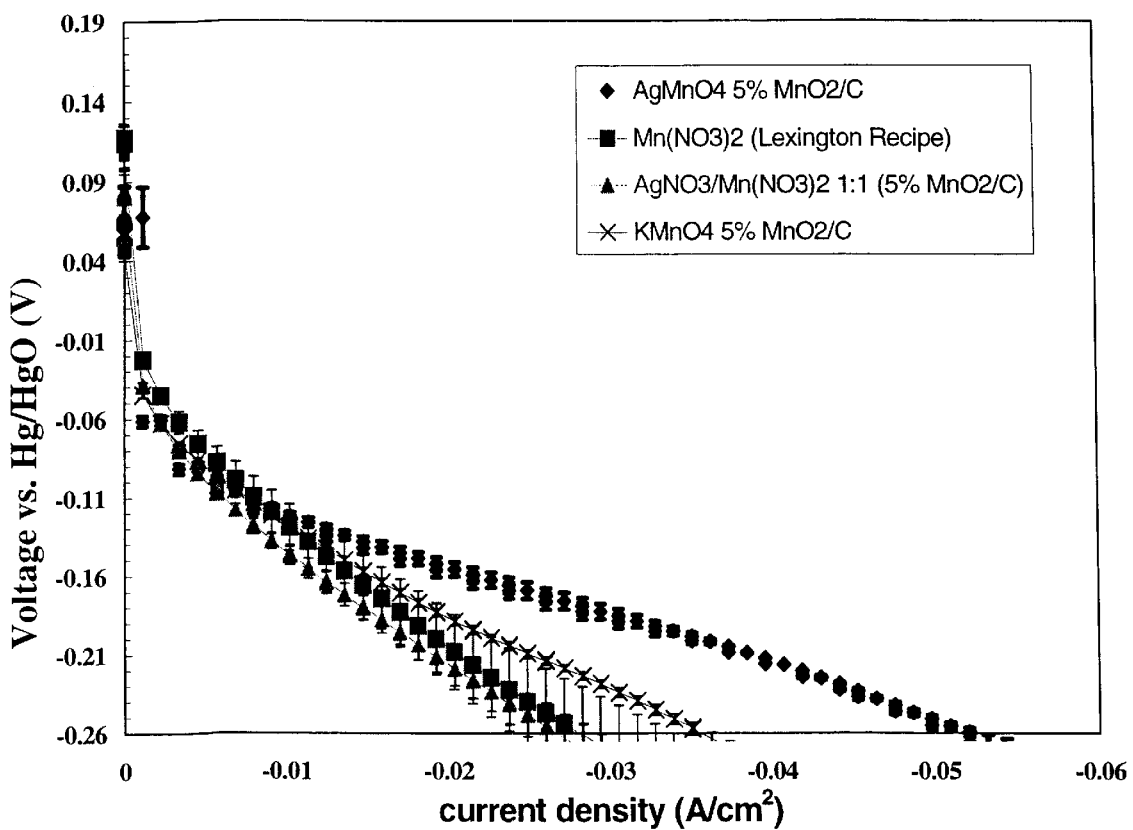
FIG. 6 is a graph showing the limiting currents of cathodes made using different catalyst precursors.

The benefits of using AgMnO$_4$ as a catalyst precursor can also be seen in FIG. 6. Cathodes were prepared using (a) AgMnO$_4$, (b) Mn(NO$_3$)$_2$, (c) a mixture of AgNO$_3$ and Mn(NO$_3$)$_2$, and (d) KMnO$_4$ as precursors. The cathode prepared using AgMnO$_4$ as the catalyst precursor showed the best performance; the limiting current at the cutoff voltage was about 52 mA/cm$^2$. The cathode prepared using a mixture of AgNO$_3$ and Mn(NO$_3$)$_2$ as precursors did not perform as well, even though it contained both MnO$_2$ and Ag. These results demonstrate the superiority of AgMnO$_4$ as a catalyst precursor.

EXAMPLE 2

AgMnO$_4$ (5% by weight) and Vulcan XC-72 carbon were combined as described in Example 1. Cathodes were prepared using 50% by weight of the catalyst-containing Vulcan carbon and 50% by weight of Monarch 1300 carbon.

Four half cells were prepared, using these cathodes, as follows. The cathodes were placed in vials. 1.0 g 9N KOH was added to each vial, then 10–10.5 g anode gel was added to each vial. The current densities for the cathodes of two cells were measured 2 hours after the electrolyte was added, and the current densities for the cathodes of two cells were measured 72 hours after the electrolyte was added.

Figure 7:
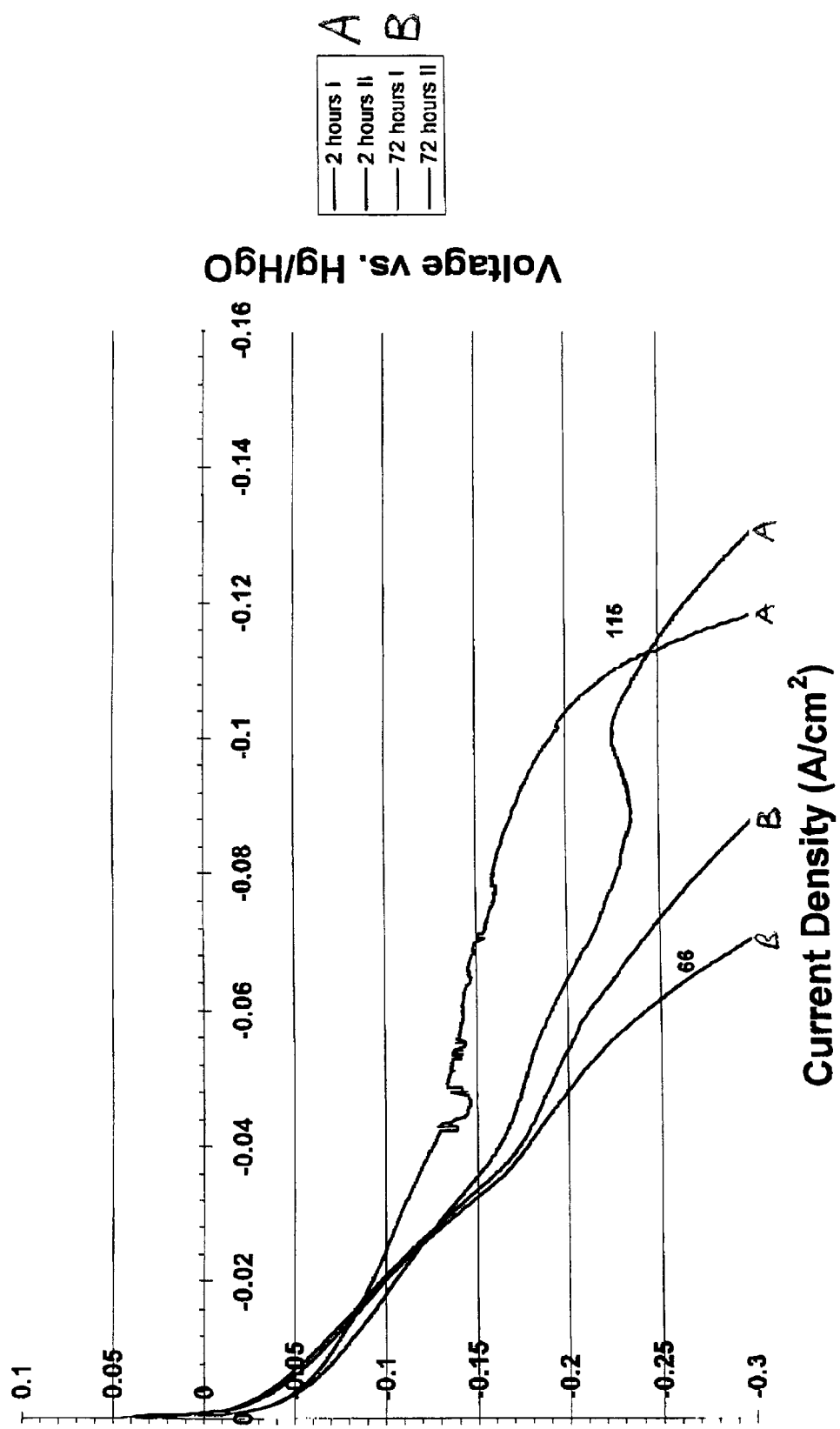
FIGS. 7 and 8 are graphs showing the current densities of cathodes of the invention.

Referring to FIG. 7, the cathodes had current densities of 115 mA/cm$^2$ at a voltage of –0.25 volts, versus a Hg/HgO reference after 2 hours. As is discussed above, measurements from two different half cells were taken; the mean of the two values was 115.

After 72 hours, the cathodes had current densities of 66 mA/cm$^2$. Once again, two separate measurements were taken; the mean of the two values was 66. These results demonstrate that cathodes made using AgMnO$_4$ as the catalyst precursor are capable of very high current densities.

EXAMPLE 3

AgMnO$_4$ was combined with Monarch carbon using the procedure described in Example 1. Cathodes were prepared using this carbon as described in Example 1. A gelled electrolyte was prepared as follows. Carbopol 940 gelling agent and A221 water-lock agent were added to 9N KOH; the final mixture contained 1.6% by weight Carbopol and 0.71% by weight water-lock agent.

The cathodes were placed in three separate vials (A, B, and C). To vials A and B were added 1.0 g of the gelled electrolyte. To vial C was added 1.0 g 9N KOH liquid electrolyte. Anode gel was added to each of the three vials. The vials were allowed to rest one hour or 24 hours. The current densities of the cathodes were then measured.

Figure 8:
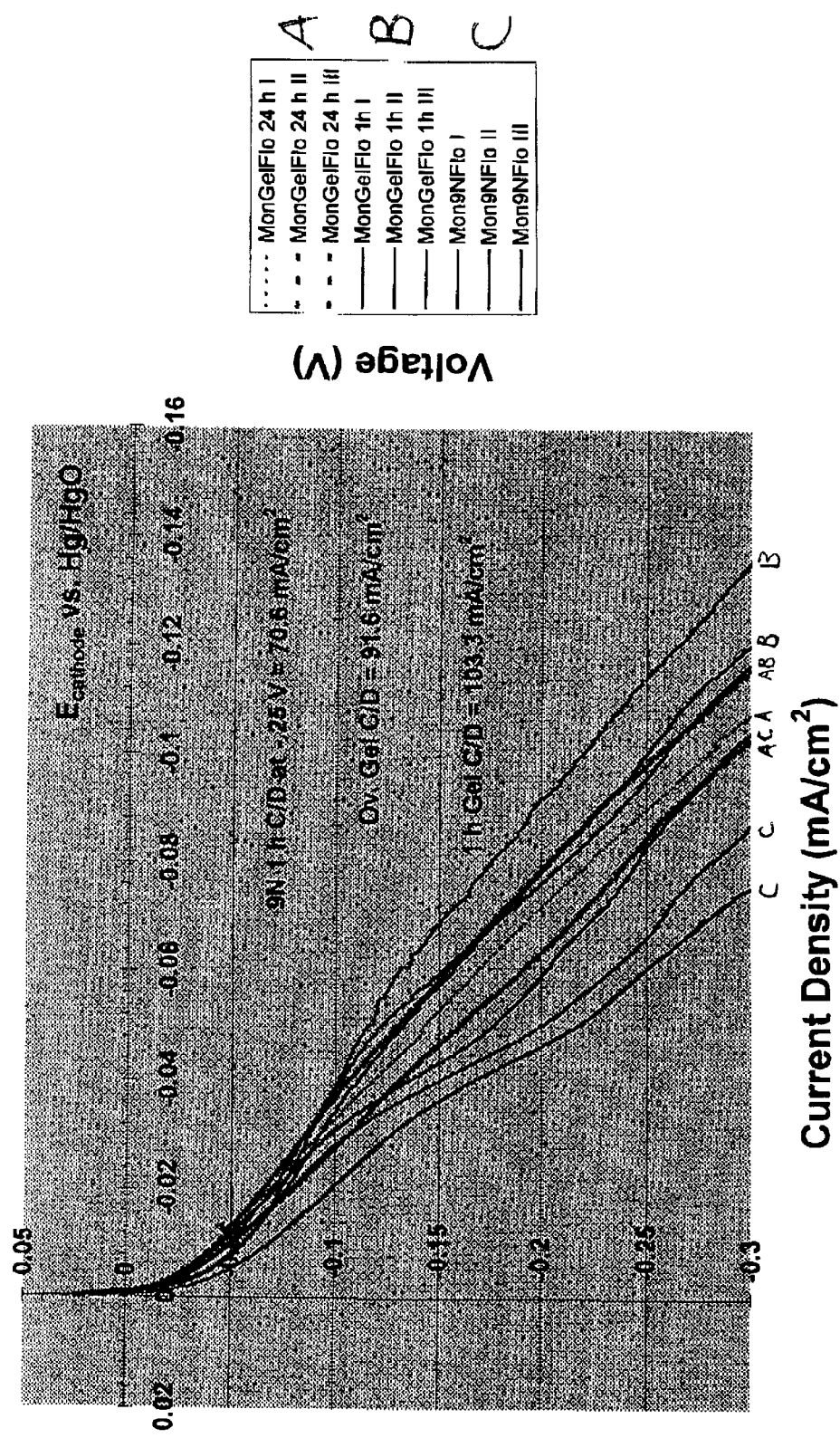

Referring to FIG. 8, when gelled electrolyte was used and the half cell was allowed to rest for 24 hours (A), the cathode had a current density of 91.6 mA/cm$^2$ at a voltage of –0.25 volts, versus a Hg/HgO reference. Three measurements were taken; the mean value of these three measurements was reported.

When gelled electrolyte was used and the half cell was allowed to rest one hour, the cathode had a current density of 103.3 mA/cm$^2$ at a voltage of –0.25 volts, versus a Hg/HgO reference. Three measurements were taken; the mean value of these three measurements was reported.

When liquid electrolyte was used and the half cell was allowed to rest one hour, the cathode had a current density of 70.6 mA/cm$^2$ at a voltage of –0.25 volts, versus a Hg/HgO reference. Three measurements were taken; the mean value of these three measurements was reported.

EXAMPLE 4

40 g of Monarch 1300 carbon treated with AgMnO$_4$ (5% MnO$_2$/C) were blended with 40 g of uncatalyzed Monarch 1300 and 22.86 g of Faradiser TR CMD (Sedema, Inc.). Approximately 150–200 ml isopropanol were added to the carbon mixture in a planetary mixer to form a paste. The paste was allowed to stir thoroughly for 20 minutes. 19.05 grams of T-30 PTFE dispersion were then added to the carbon paste and allowed to mix for 1–2 minutes to form a dough (10% by weight solids). The dough was rolled onto a nickel-plated stainless steel screen using a pressure roller until an electrode thickness of 0.30–0.35 mm was achieved. After most of the alcohol was blotted out using the pressure roller, a 10 mesh polyethylene screen was co-rolled with the electrode on the side opposite to the current collector screen to imprint the texture of the screen onto the carbon. This textured layer was then allowed to dry at ambient conditions overnight.

A paste was made with 70 grams of Vulcan XC-72 and 300–400 ml isopropanol. 50 grams of T-30 PTFE dispersion was added slowly and allowed to mix for 1 minute until a dough (30% by weight solids) formed. The dough was rolled on top of the textured catalyst layer using a pressure roller until the electrode thickness was 0.40–0.55 mm. The electrode was allowed to air dry overnight. The finished electrode was baked at 280–300° C. for 4–8 hours. The electrode was then laminated with a PTFE membrane on the air side and a Celgard 5550 (Hoechst-Celanese) separator on the catalyst side.

Polarization curves of the electrode were then performed in a half cell test fixture versus Zn and versus a Hg/HgO reference, as described above. The half cells were assembled and allowed to sit overnight in 51% relative humidity.

Figure 9:
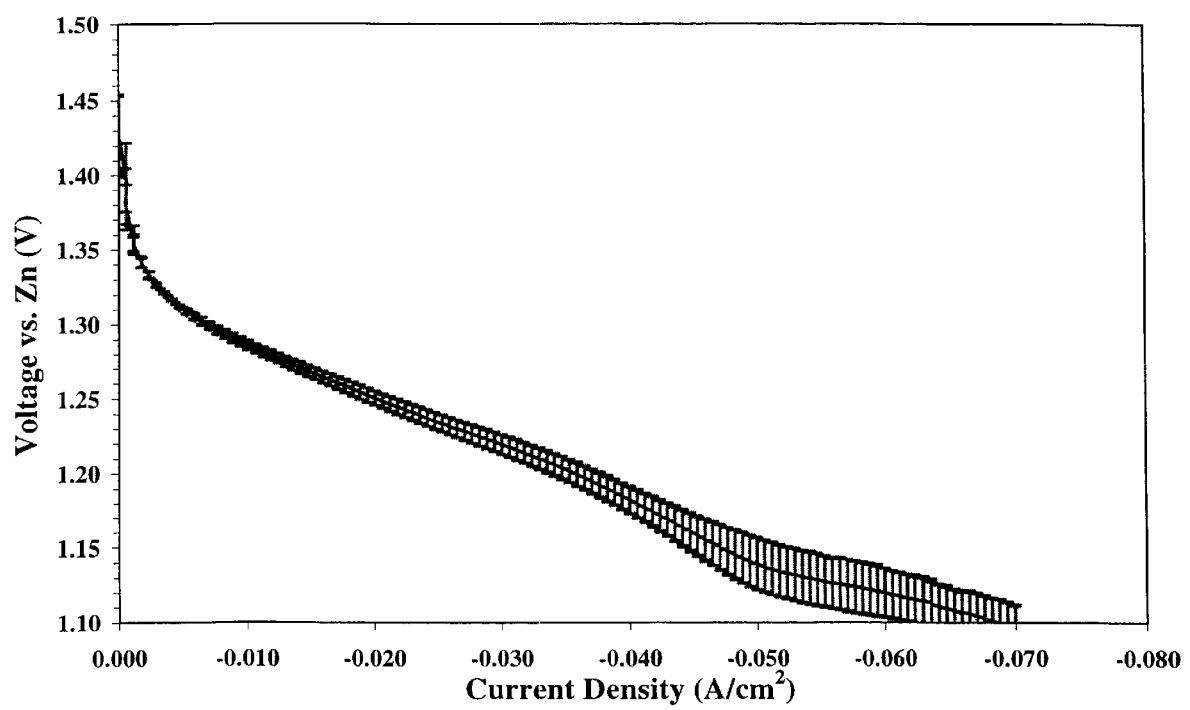
FIG. 9 is a graph showing the limiting current of a cathode of the invention.

Referring to FIG. 9, the polarization curve of a dual layer electrode shows the limiting current to be about 70 mA/cm$^2$.

Figure 10:
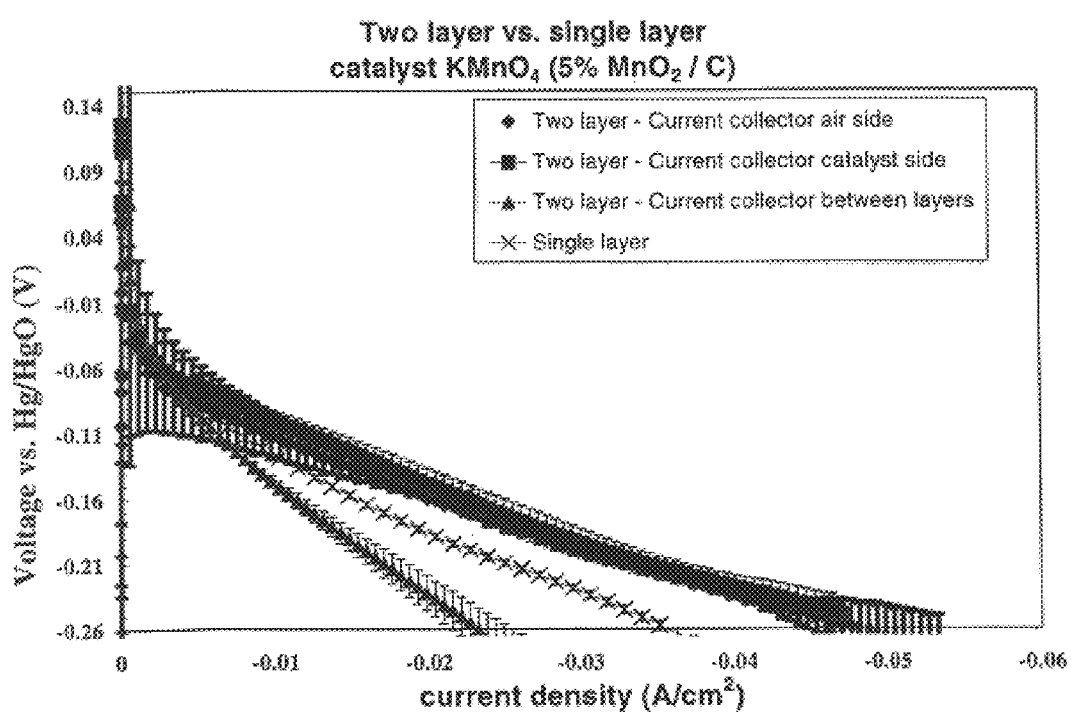
FIG. 10 is a graph showing the limiting currents of single layer and dual layer cathodes.

Referring to FIG. 10, the polarization curves of dual layer cathodes and a single layered cathode of a similar catalytic composition are compared,. In the dual layer cathodes, the current collector was disposed on the air side, on the catalyst side, or between the two layers (as shown in FIGS. 3a–c). The x-axis of the graph represents a voltage of –0.25 volts, versus a Hg/HgO reference. As shown in FIG. 10, the dual layer cathodes generally performed better than the single layer cathode (shown as X's) under these conditions.

In the configurations in which the current collector was disposed on the catalyst side (shown as squares) or on the air side (shown as diamonds), the interface between the two layers was textured. These configurations gave better performance than the cathode in which the current collector was between the two layers, and the interface between the layers was not textured (shown as triangles). These results demonstrate the effects of texturing the interface and placement of the current collector.

All publications and patents mentioned in this application are herein incorporated by reference to the same extent as if each individual publication or patent was specifically and individually indicated to be incorporated by reference.

Other Embodiments

From the foregoing description, it will be apparent that variations and modifications may be made to the invention described herein to adopt it to various usages and conditions. Such embodiments are also within the scope of the following claims.

What is claimed is:

1. A cathode for a metal air electrochemical cell, the cathode comprising:

(a) a first layer including about 30% to about 70% of an organic polymer by weight;

(b) a second layer including about 10% to about 30% of an organic polymer by weight; and (c) a catalyst, wherein the first layer and the second layer contact each other at a substantially continuous textured interface, and wherein the cathode includes a current collector that does not contact the interface.

2. The cathode of claim 1, wherein the cathode includes from about 0.1% to about 20% of the catalyst by weight.

3. The cathode of claim 1, wherein the first layer includes a catalyst.

4. The cathode of claim 3, wherein the second layer includes a catalyst.

5. The cathode of claim 4, wherein the first layer and the second layer contain different catalysts.

6. The cathode of claim 1, wherein the catalyst is selected from the group consisting of manganese oxides, precious metals, metal heterocycles, and cobalt, and mixtures thereof.

7. The cathode of claim 6, wherein the catalyst is manganese dioxide.

8. The cathode of claim 7, wherein the cathode further comprises a silver catalyst.

9. The cathode of claim 1, wherein the textured interface is coated with a catalyst.

10. The cathode of claim 9, wherein the first layer includes a catalyst that is different from the catalyst coating the interface.

11. The cathode of claim 10, wherein the catalyst coating the interface is selected from the group consisting of platinum and silver catalysts.

12. The cathode of claim 11, wherein the catalyst coating the interface is a platinum catalyst.

13. The cathode of claim 12, wherein the cathode contains less than about 3% by weight of the platinum catalyst.

14. The cathode of claim 1, wherein the organic polymer is polytetrafluoroethylene.

15. A metal air electrochemical cell comprising:

an anode including an anode can and an anode gel;

a cathode, the cathode including a cathode can having at least one air access port and containing a cathode structure, the anode can and cathode can being assembled to form a cell; and a separator electronically separating the anode and the cathode positioned between the anode gel and the cathode structure;

wherein the cathode structure comprises (a) a first layer including about 30% to about 70% of an organic polymer by weight; (b) a second layer including about 10% to about 30% of an organic polymer by weight; and (c) a catalyst, wherein the first layer and the second layer contact each other at a substantially continuous textured interface, and wherein the cathode includes a current collector that does not contact the interface.

16. A method of making an electrochemical cell, the method comprising combining carbon with $AgMnO_4$ to form a mixture, reducing the $AgMnO_4$ in the mixture to form $MnO_2$, preparing a cathode with the $MnO_2$, and introducing an aqueous electrolyte into the cell.

17. The method of claim 16, wherein the electrochemical is a metal air cell.

18. The method of claim 16, wherein the electrochemical cell is an air-assisted alkaline cell.

19. The method of claim 16, further comprising combining the carbon and the $AgMnO_4$ with PTFE to form the mixture.

20. The method of claim 16, wherein the method comprises combining carbon with less than about 5 percent by weight $AgMnO_4$ to form the mixture.

21. A cathode for a zinc air cell that has a current density of at least 70 $mA/cm^2$ at a voltage of −0.25 volts, versus a Hg/HgO reference, wherein the cell has a zinc slurry anode, wherein the cathode includes two layers, each of the layers including an organic polymer and contacting each other at a textured interface, and wherein the cathode includes a current collector that does not contact the interface.

22. The cathode of claim 21, wherein the cathode has a current density of at least 80 $mA/cm^2$ at a voltage of −0.25 volts, versus a Hg/HgO reference.

23. The cathode of claim 22, wherein the cathode has a current density of at least 90 $mA/cm^2$ at a voltage of −0.25 volts, versus a Hg/HgO reference.

24. The cathode of claim 23, wherein the cathode has a current density of at least 100 $mA/cm^2$ at a voltage of −0.25 volts, versus a Hg/HgO reference.

25. The cathode of claim 1, wherein the first layer contacts a current collector.

26. The cathode of claim 1, wherein the second layer contacts a current collector.

* * * * *

UNITED STATES PATENT AND TRADEMARK OFFICE
CERTIFICATE OF CORRECTION

PATENT NO. : 6,632,557 B1 Page 1 of 1
DATED : October 14, 2003
INVENTOR(S) : David L. Pappas et al.

It is certified that error appears in the above-identified patent and that said Letters Patent is hereby corrected as shown below:

Title page,
Item [56], References Cited, U.S. PATENT DOCUMENTS, replace
"1/1990 Borbely et al." with -- 5/1994 Khasin et al. --; and replace
"5/1994 Khasin et al." with -- 1/1990 Borbely et al. --.

Column 11,
Line 50, after "can" replace "being" with -- be --.

Column 12,
Line 19, after "electrochemical" insert -- cell --.

Signed and Sealed this

Thirteenth Day of April, 2004

JON W. DUDAS
*Acting Director of the United States Patent and Trademark Office*